(12) United States Patent
Lenneman et al.

(10) Patent No.: US 8,188,844 B2
(45) Date of Patent: May 29, 2012

(54) RECONFIGURABLE TACTILE INTERFACE UTILIZING ACTIVE MATERIAL ACTUATION

(75) Inventors: John K. Lenneman, Okemos, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 515 days.

(21) Appl. No.: 12/371,867

(22) Filed: Feb. 16, 2009

(65) Prior Publication Data

US 2010/0207775 A1 Aug. 19, 2010

(51) Int. Cl.
*H04B 3/36* (2006.01)
*B60Q 1/00* (2006.01)
*G09F 9/00* (2006.01)

(52) U.S. Cl. ............ 340/407.1; 340/407.2; 340/691.6; 340/461; 340/525; 340/4.12; 310/328; 715/702; 345/156

(58) Field of Classification Search ............... 340/407.1
See application file for complete search history.

(56) References Cited

U.S. PATENT DOCUMENTS

| | | | | |
|---|---|---|---|---|
| 6,911,764 B2 * | 6/2005 | Pelrine et al. | ......... | 310/328 |
| 7,567,681 B2 * | 7/2009 | Pelrine et al. | ......... | 381/191 |
| 7,638,921 B2 * | 12/2009 | Browne et al. | ......... | 310/307 |
| 7,714,701 B2 * | 5/2010 | Altan et al. | ......... | 340/407.1 |

\* cited by examiner

*Primary Examiner* — Donnie Crosland (57) ABSTRACT

A reconfigurable tactile human-machine interface adapted for facilitating selection and manipulation by a user, presenting a first geometric shape, orientation, position, or characteristic, and including at least one active material element configured to cause the interface to achieve a second geometric shape, orientation, position or otherwise characteristic when activated or deactivated, and preferably further including at least one sensor, and a controller communicatively coupled to the sensor and interface and configured to selectively cause the element to be activated upon receipt of sensory input.

12 Claims, 4 Drawing Sheets

RECONFIGURABLE TACTILE INTERFACE UTILIZING ACTIVE MATERIAL ACTUATION

BACKGROUND OF THE INVENTION

1. Technical Field

This disclosure generally relates to tactile human-machine interfaces, such as buttons, knobs, dials, etc., and more particularly to an interface or control that utilizes active material actuation to change a first geometric shape, orientation, position or otherwise characteristic of the interface.

2. Background Art

Human-machine interfaces (HMI's) have long provided facilitating means for entering user-generated input into a communicatively coupled system. Among these, tactile interfaces, such as buttons, knobs, dials, etc., allow a user to manually enter an input. For example, in an automotive setting, knobs are often rotated by a user to change an aspect of a telematic, entertainment, diagnostic, wiper, or HVAC system. That is to say, manipulation of a volume knob may resultantly cause a potentiometer to slide, thereby increasing or decreasing power to the speaker system and volume.

It is appreciated by those of ordinary skill in the art, however, that the use of conventional tactile HMI's present various concerns in the art; for example, as exemplified in an automotive setting, the user is often required to temporarily draw his or her attention away from a main task, such as properly operating the vehicle, in order to distinguish amongst a plurality of similarly sized and shaped HMI's. In a dimly lit or dark space (e.g., the interior cab of a vehicle while driving at night) selecting the desired interface may be further obfuscated. Once selected, it is known in the art to release a detent or latch by depressing the HMI, so as to cause it to extend towards a more readily manipulated position; however these configurations require even more attention than static HMI's. Of further concern, it is also appreciated that engagement between a variety of user hand sizes and a one-size-fits-all HMI configuration often results in a tactile HMI that is difficult to manipulate for certain users.

BRIEF SUMMARY

In response to the afore-mentioned concerns, the present invention involves a reconfigurable tactile human-machine interface that utilizes active material actuation to selectively (e.g., on demand, etc.) and autonomously drive reconfiguration. Thus, the inventive HMI is useful for facilitating selection and manipulation by a user, for offering visual confirmation of (hands-off) selection by the user, and for reducing the amount of attention necessary to distinguish amongst a plurality of interfaces. As such, in automotive settings, the invention is useful for reducing work load of a vehicle operator, for example, by reducing eyes-off-road time, and the likelihood of feature lock-outs resulting from eyes-off-road time. By changing its geometric shape and/or size, the reconfigurable interface facilitates use with a variety of user hand sizes, and improves ergonomics particularly for challenged individuals. Moreover, with respect to consumer gratification, the ability to change HMI's in accordance with user preference enables increased personalization.

Finally, it is appreciated that usage of active material elements, as presented herein, reduces weight and/or complexity in comparison to counterpart mechanical, electro-mechanical, hydraulic, or pneumatic based systems. Moreover, it is appreciated that active material use increases energy efficiency, and reduces the likelihood of failure as well as costs associated therewith.

A first aspect of the invention concerns a tactile human-machine interface adapted for facilitating identification by a user and modification of the associated system. In one embodiment, the interface includes a reconfigurable body presenting a first geometric shape. The body is communicatively coupled to and operable to modify at least one condition of the system when manually manipulated. The interface further includes at least one active material element drivenly coupled to the body. The body and element may be integrally formed. The element is operable to undergo a reversible change in fundamental property when exposed to or occluded from an activation signal; and the change causes the body to achieve a second geometric shape, orientation, position, or characteristic.

Thus, a second aspect of the invention concerns a method of facilitating selection of a tactile human-machine interface by a user, wherein the interface presents a first geometric shape. The method includes the steps of securing the interface relative to a source operable to expose the interface to an activation signal, and selectively causing the interface to be exposed to the signal. The geometric shape of the interface is modified as a result of being exposed to the signal, prior to selection. After selection and/or variously after use of the interface, after vehicle shutdown, by demand, or after appropriate sensor input, the signal is discontinued, and the interface is reversibly modified back to the first shape.

Other aspects and advantages of the present invention, including the employment of shape memory alloys, shape memory polymers, and other active materials for actuating, and utilizing sensor input/voice activation will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein.

DETAILED DESCRIPTION

The following description and illustrated embodiments of the invention are merely exemplary in nature and in no way intended to limit the disclosure, its application, or uses. Though described and illustrated with respect to automotive application; it is certainly within the ambit of the invention to use the benefits and features presented herein, in other settings, such as regarding portable, residential, aviation, or commercial building system controls.

In general, the present invention concerns a reconfigurable tactile human-machine interface ("HMI" or "interface") 10 that utilizes active material actuation to modify its geometric shape, positioning, orientation, and/or otherwise characteristic, such that selection and/or manipulation by a user 12 is facilitated (FIGS. 1-6). As used herein, the term "tactile human-machine interface" encompasses manually manipulated systems controls, and shall include knobs, push-buttons, dials, switches, sliders, balls, and rockers, etc. As is known in the art, manual manipulation of the interface 10 causes input to be received by an associated system (or "machine") 14. As such, it is appreciated that the interface 10 is communicatively coupled to and operable to modify at least one condition of the system 14; for example, the interface 10 may be a rotatable knob that presents the volume control of an entertainment system 14.

Discussion of Exemplary Active Material Function and Constitution

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials, such as shape memory alloys, ceramics, and polymers, magnetorheological elastomers, thin strips of piezoceramic bi-morphs, thin films or pockets of MR fluid, and EAP diaphragms/tendons/roll actuators/etc. More preferably, it is appreciated that a dielectric elastomer EAP (i.e., a dielectric elastic film disposed between two electrodes) is especially suited for use in the present invention. Moreover, as used herein the term "active material" shall further include compositions of paraffin wax and other materials that exhibit significant (e.g., at least 8%) volumetric change during thermally induced solid-liquid phase change.

More particularly, shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include the afore-mentioned shape memory alloys (SMA) and shape memory polymers (SMP), as well as shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control of shape with continuous power supplied. External magnetic fields are generally produced via soft-magnetic core electromagnets in automotive applications, though a pair of Helmholtz coils may also be used for fast response.

Generally, SMP's are co-polymers comprising at least two different units which may be described as defining different segments within the co-polymer, each segment contributing differently to the elastic modulus properties and thermal transition temperatures of the material. "Segment" refers to a block, graft, or sequence of the same or similar monomer or oligomer units which are copolymerized to form a continuous cross-linked interpenetrating network of these segments. These segments may be crystalline or amorphous materials and therefore may be generally classified as a hard segment(s) or a soft segment(s), wherein the hard segment generally has a higher glass transition temperature ($T_g$) or melting point than the soft segment.

Each segment then contributes to the overall flexural modulus properties of the shape memory polymer (SMP) and the thermal transitions thereof, the hard segments tending to increase and the soft segments tending to decrease both the flexural modulus properties and the temperatures associated with their changes. When multiple segments are used, multiple thermal transition temperatures may be observed, wherein the thermal transition temperatures of the copolymer may be approximated as weighted averages of the thermal transition temperatures of its comprising segments.

The previously defined or permanent shape of an SMP can be set by melting or processing the polymer at a temperature higher than the highest thermal transition temperature for the shape memory polymer or its melting point, followed by cooling below that thermal transition temperature. The temperature necessary to set the permanent shape is preferably between about 100° C. to about 300° C. A temporary shape can be set by heating the material to a temperature higher than any $T_g$ or thermal transition temperature of the shape memory polymer, but lower than the highest $T_g$ or its melting point. The temporary shape is set by applying an external stress or load while processing the material above the $T_g$, but below the highest thermal transition temperature or melting point of the shape memory material followed by cooling to fix the shape.

The material can then be reverted to the permanent shape by heating the material, with the stress or load removed, above its $T_g$ but below the highest thermal transition temperature or melting point. Thus, by combining multiple soft segments it is possible to demonstrate multiple temporary shapes and with multiple hard segments it may be possible to demonstrate multiple permanent shapes. Similarly using a layered or composite approach, a combination of multiple SMP's will demonstrate transitions between multiple temporary and permanent shapes.

At the soft segment transition temperature (also termed "first transition temperature"), the temporary shape of the shape memory polymer is set followed by cooling of the shape memory polymer, while still under load, to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 160° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature with the stress or load removed, the permanent shape is achieved and the shape will not revert back to the temporary shape without the use of outside forces.

As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape of the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

SMP can be configured in many different forms and shapes. The temperature needed for permanent shape recovery can be set at any temperature between about −63° C. and about 160° C. or above. It should be apparent to those skilled in the art that engineering the composition and structure of the polymer itself can allow for the choice of the selected temperature for a desired application. For example, the selected temperature in an interface that is engaged by the user 12 during transition will desirably be lower than an interface 10 engaged by the user 12 after transition.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbomyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply (butyl methacrylate), poly(isobutyl methacrylate), poly (hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate).

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol mono-oleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. Of particular suitability to the present invention are dielectric elastomers, which include a dielectric elastic film sandwiched in between two electrodes. One example of a dielectric elastomer is an electrostrictive-grafted elastomer with a piezoelectric poly(vinylidene fluoride-trifluoro-ethylene) copolymer. This combination has the ability to produce a varied amount of ferroelectric-electrostrictive, molecular composite systems, and may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Exemplary Active Material HMI's, Applications, and Uses

Figure 1:
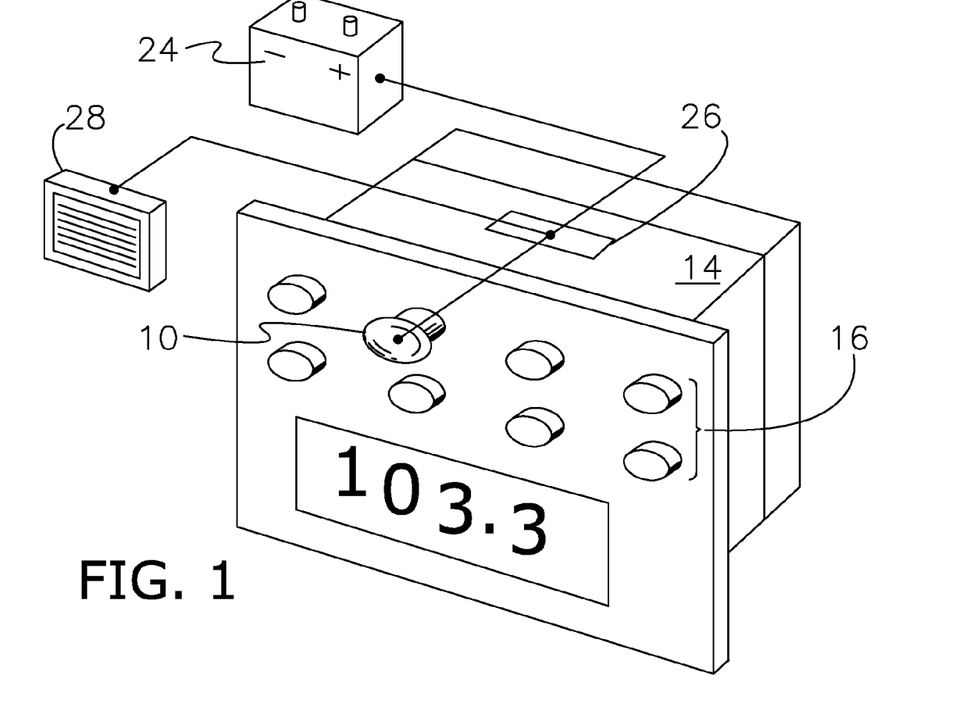
FIG. 1 is a perspective view of a plurality of human-machine interfaces (HMI's) operatively coupled to an entertainment system/controller, a microphone/sensor coupled to the system, and a signal source coupled to the system/controller and HMI's, in accordance with a preferred embodiment of the invention.
Figure 1A:
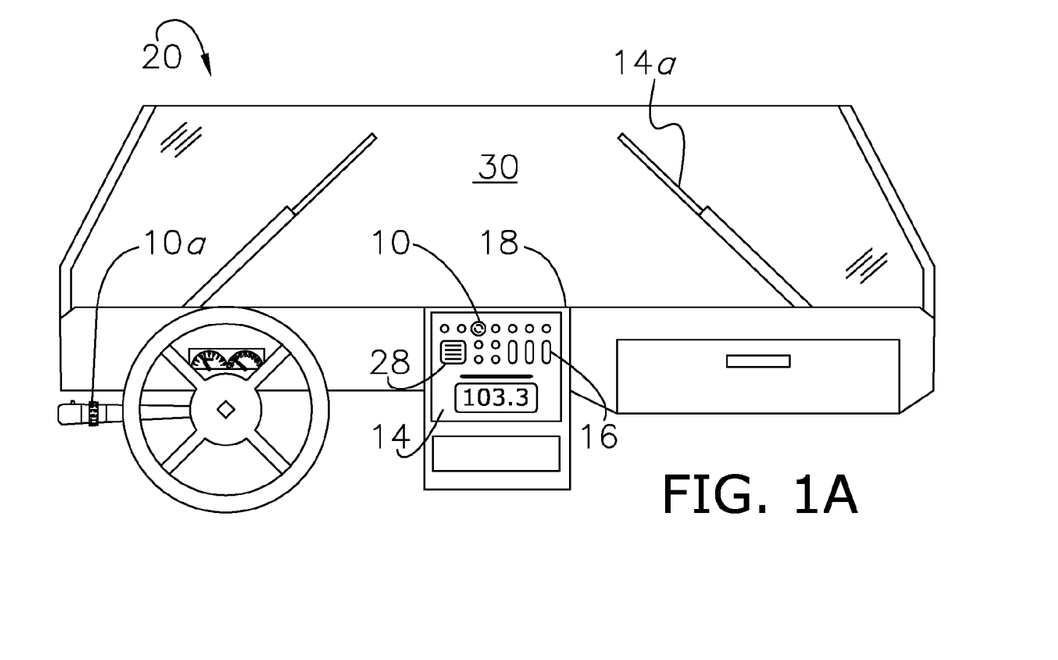
FIG. 1A is an elevation of the front interior cabin of a vehicle, particularly illustrating a wiper system, and active material based HMI's associated with the wiper system, in accordance with a preferred embodiment of the invention.
Figure 3:
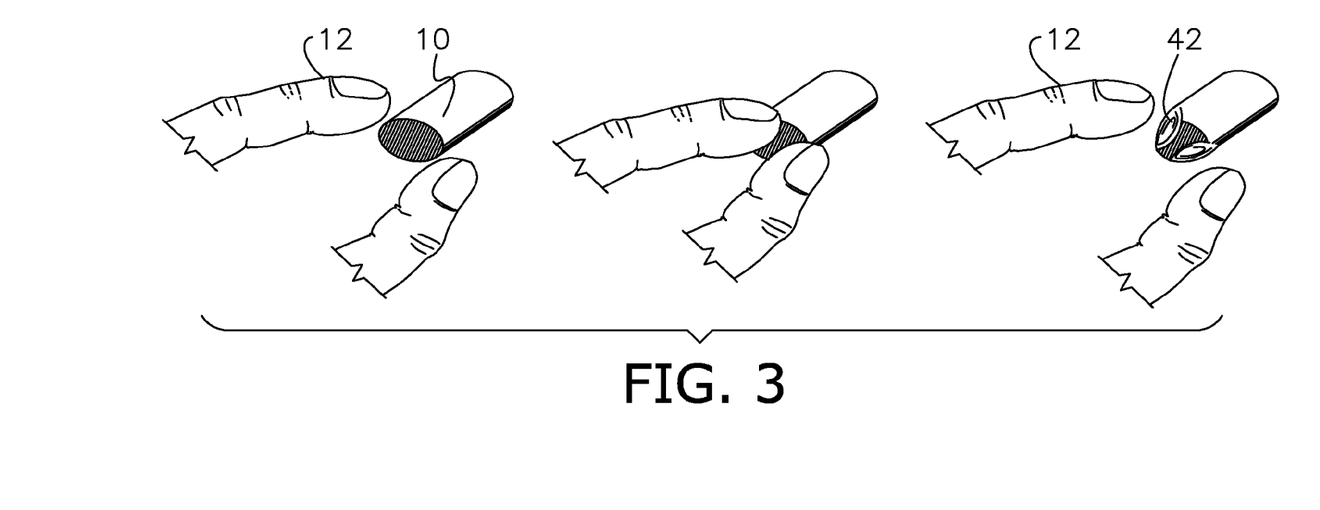
FIG. 3 presents perspective views of a reconfigurable HMI being customized by a user, in accordance with a preferred embodiment of the invention.

As previously stated, it is intended that the modification of at least a portion of the interface 10 facilitates selection and manipulation by a human user 12 (FIG. 3). That is to say, the invention facilitates discriminating and distinguishing the desired interface 10 from a plurality of interfaces 16 by offering a visibly and also tactilely distinct, and more preferably unique geometric shape, orientation, position or characteristic, in comparison to the other interfaces 16. In FIGS. 1 and 1A, for example, a plurality of cylindrical knobs 16 extend from the instrument panel 18 of a vehicle 20 and is coupled to a radio system 14; to facilitate selection of interface 10, selective modification to the enlarged distal configuration shown is caused. Moreover, where modification results from user action (e.g., manual activation, sensor detection (e.g., proximity, contact, pressure, etc.), user preference settings, voice command, etc.), the invention provides visual and tactile confirmation that the system 12 was properly selected. Finally, the preferred reconfigurable interface 10 also facilitates manual engagement by the user 14 by changing its geometric shape to one that is more readily manipulated by a human hand.

More particularly, and as shown in FIGS. 1-6, the interface 10 includes or is drivenly coupled to at least one active material element 22 that acts as the actuator for modification. The element (or "actuator") 22 is comprised of an active material and therefore operable to undergo a reversible change in fundamental property when exposed to or occluded from an activation signal, as described above. In a preferred embodiment, the fundamental property change causes the element 22 to undergo a change in a dimension, e.g. due to the contraction or expansion of the element 22, or in a characteristic of the element 22, such as the spring constant or fluid shear strength thereof. The change in the elemental 22 causes the interface 10 to achieve a second geometric shape, position, orientation, and/or otherwise characteristic different from at least the adjacent interfaces 16 (FIG. 1).

The element 22 is communicatively coupled to a source 24 that is operable to generate the activation signal in such a manner that the element 22 is selectively caused to be exposed to the signal. For example, in the automotive setting shown in FIGS. 1 and 1A, the source 24 is presented by the charging system or battery of the vehicle 20, and a thermal activation signal is selectively produced by passing a current through the resistance of the element 22, so as to result in Joule heating.

More preferably, a controller 26 is intermediately coupled to the source 24 and element 22, and programmably configured to control exposure to the signal by the element 22. In this regard, it is appreciated that the interface 10 may be configured such that it reverts back to the original shape upon the discontinuance of the signal. To that end, a pseudoplastically strained SMA element 22 may be utilized. In this configuration, upon discontinuance of the thermal signal, the element 22 begins to cool, which works to return it back to the original martensitic state; moreover, it is appreciated that the strain in the element 22 works to accelerate transition to the martensitic state.

Alternatively, the element 22 may be configured such that the interface 10 is caused, when activated, to achieve a permanent second shape that is maintained even when the signal is terminated. The element 22 preferably presents "two-way" action, wherein returning to the original condition is caused by re-activation. In this configuration a suitable SMP, SMA, or MR elastomer may exemplarily be utilized. In yet another alternative, such as in the case of using SMA as the actuator element 22 (either in terms of its shape memory or superelastic properties) a latch or detent (not shown) may be caused to engage the interface 10 when modified, so as to provide a zero-power hold, and thereby eliminate the need for a constant signal to maintain the second shape, position, orientation or characteristic. The latch or detent may be released by a subsequent activation of the element 22, or by a second actuator (not shown) coupled thereto. The second actuator may be electro-mechanically driven or may also utilize active material actuation.

Additionally, at least one sensor 28, operable to detect a condition relative to or that typically triggers use of the system 14, and generate a data signal based thereupon, is communicatively coupled, so as to send the data signal to the controller 26. As further discussed below, the controller 26 is configured to selectively cause activation or deactivation only when the data signal is received. For example, the sensor 28 may be operable to detect moisture upon a windshield 30 of the vehicle 20, and the interface 10a may be the windshield wiper control dial (FIG. 1A). Here, the source 24, sensor 28, controller 26, and wiper interface 10a may be cooperatively configured such that the interface 10a increases in diameter so as to raise from a surface cooperatively defined by a group of proximate dials.

In another example (shown in FIG. 1) the sensor 28 may be a microphone operable to detect a voice command. In this configuration, the controller 26 is communicatively coupled to the microphone 28 and equipped with suitable voice recognition software, so as to be able to distinguish the directed command from other audible sounds. The controller 26 is configured to cause the interface 10 to be exposed to the signal only when the command is received.

Figure 2A:
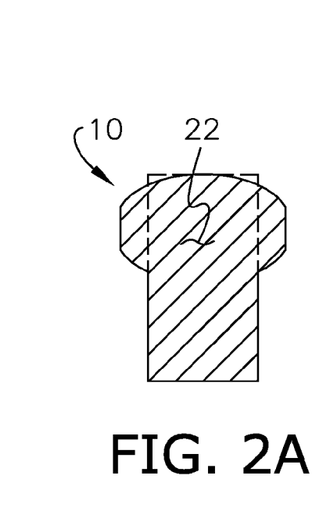
FIG. 2A is a cross-sectional elevation of an HMI presenting an upper portion having an enlarged diameter and comprised of an active material, in accordance with a preferred embodiment of the invention.

Turning to the structural configuration of the interface 10, FIG. 2A presents a first embodiment, wherein the interface 10 is formed entirely of the active material. In this configuration the interface/element may be comprised of a suitable SMP. Alternatively, the interface 10 may be integrally formed by the element 22 and a body 32 of non-active material, so as to present a composite structure. For example, the element 22 may define a longitudinal section (e.g., the distal half of the interface 10), or longitudinal/lateral strips. In another alternative, the element 22 may be embedded within a conformal non-active body 32.

Figure 2B:
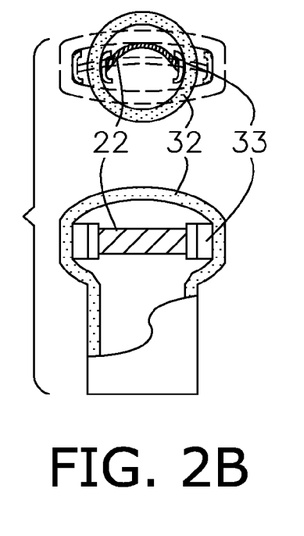
FIG. 2B presents cross-sectional elevation and planar views of an HMI presenting an upper portion having an enlarged diameter and including an internal EAP or shape memory strip, in accordance with a preferred embodiment of the invention.
Figure 2C:
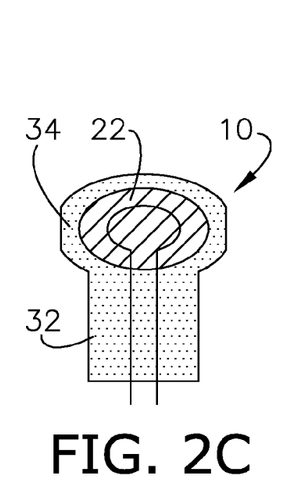
FIG. 2C is a cross-sectional elevation of an HMI presenting an upper portion having an enlarged diameter and including an embedded active material element, and first and second leads connected thereto, in accordance with a preferred embodiment of the invention.

In the embodiment shown in FIG. 2B, the body 32 defines a bulbous distal section, and the element 22 presents a strip of active material housed therein. The material, in this configuration, may be a suitable SMP or EAP. When activated, the element 22 is caused to lengthen or straighten (where the element 22 is in a bent configuration in the deactivated state as shown in planar view of FIG. 2B), so as to exert an outward force upon the conformal body 32. As a result, an originally circular lateral cross-section will be caused to change to an ellipsoidal cross-section across the distal section. More preferably, the element 22 in this configuration further includes distal engaging pads 33 to better distribute the modifying force.

In another embodiment, the interface 10 may define an exterior surface and an interior space configured to retain the element 22 (FIG. 2C); the element 22 is inserted within the space and configured, relative thereto, so as to exert a modifying force upon the non-active material when activated or deactivated. The material is conformal such that it is caused to expand by the exerted force and collapse when the force is removed. Where electric potential or thermal energy is used to activate the element 22, it is preferable that the non-active material be configured to define an insulative outer layer 34 (FIG. 2C) that protects the user 12. Exemplary active materials particularly suitable for this embodiment include paraffin wax and EAP (in the form of a roll actuator).

Figure 2D:
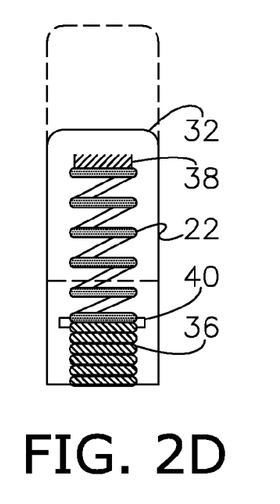
FIG. 2D is an elevation of an HMI including a translatable body, an externally engaged active material spring element and a return spring cooperating to selectively retract and deploy the body, in accordance with a preferred embodiment of the invention.

In another embodiment, the interface 10 may be modified by an externally connected element 22. For example, and as shown in FIG. 2D, a spring element 22 formed of a suitable SMA may be coupled to and configured to cause the linear motion of the body 32. Through at least one return spring 36, latch and/or detent (not shown), the interface 10 is able to autonomously achieve stowed and deployed conditions. More particularly, a pseudoplastically strained SMA spring element 22 is presented in its martensite phase, and connected in series to a biasing return spring 36 having a spring modulus in between the martensitic and austenitic moduli of the SMA spring 22.

It is appreciated that providing the necessary difference in spring moduli between the actuation and biasing springs 22,36 involves selecting appropriate cross-sectional areas for each spring. When the element 22 is heated from below its $A_s$ to above its $A_f$ temperature, it is caused to activate its shape memory and simultaneously increases the spring modulus (or stiffness) of the spring. These combined conditions in the SMA spring element 22 cause the biasing spring 36 to collapse (FIG. 2D). When the spring element 22 cools, so as to be caused to return to the martensitic state, the biasing spring 36 expands. Thus, both springs 22,36 are buttressed by fixed structure 38. The body 32 is preferably connected to the engaged distal ends of the springs 22,36, for example, by a bracket 40, so as to maximize linear displacement.

In a preferred embodiment the interface 10 is configured to achieve one of a plurality of achievable shapes, orientations, positions, and/or characteristics. For example, where SMP material is utilized, it is appreciated that the element 22 may be formed of multiple soft segments, so as to exhibit multiple transition temperatures. As previously described, the element 22 is able to achieve a first shape or configuration when reaching a first transition temperature, and a second shape when achieving a second transition temperature greater than the first. Alternatively, a plurality of elements 22 may be provided, configured, and separately coupled to the source 24, such that differing sets of elements 22 may be activated and deactivated resulting in the interface 10 being able to achieve a variety of differing geometric shapes, orientations, positions, or characteristics. In this configuration, user preference settings are preferably provided, such that the user 12 is able to select which shape, orientation, or characteristic to achieve.

As shown in FIG. 3, the preferred interface 10 may be manually modifiable when the element 22 is activated, so as to be customized by the user 12. For example, as shown in the illustrated embodiment, imprints (or impressions) 42 produced by the user's fingers may be memorized, so that subsequent engagement between the user 12 and interface 10 is facilitated. This further reduces the likelihood of slippage, and fosters more precise control of the associated system 14. In this configuration, it is appreciated that a suitable SMP, as described above, may again be utilized. Once the second or customized shape has been set (i.e., "memorized"), the interface 10 may remain in the modified shape permanently. Alternatively, the modification may be reversed causing the interface to return to the original condition; additionally for certain classes of embodiments when manipulation of the interface 10 is desired, the element 22 may be activated causing the imprints 42 to return.

Figure 4A:
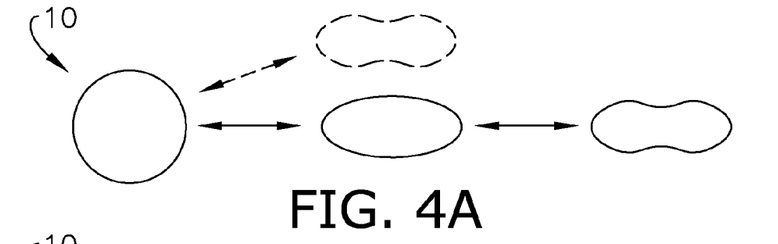
FIG. 4A is a schematic plan of an HMI reconfiguration progression from an initial circular, to an intermediate ellipsoidal, and to a final peanut shape, in accordance with a preferred embodiment of the invention.
Figure 4B:
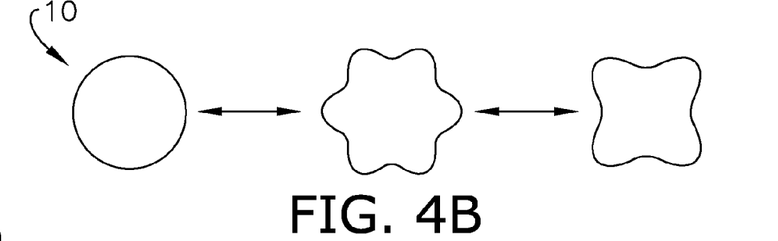
FIG. 4B is a schematic plan of an HMI reconfiguration progression from an initial circular, to an intermediate circular wave form presenting a plurality of undulations, and to a final circular wave form shape having fewer undulations, in accordance with a preferred embodiment of the invention.
Figure 4C:
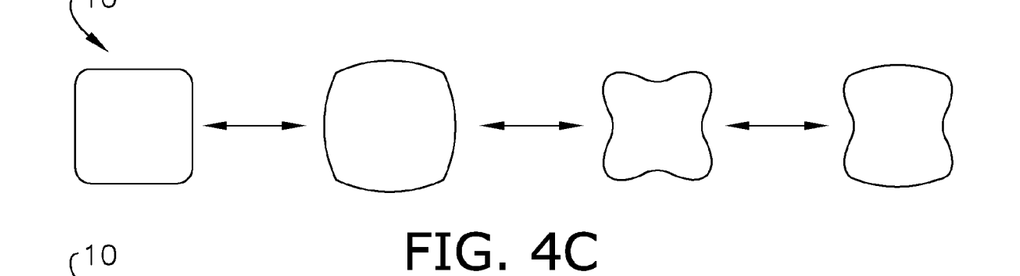
FIG. 4C is a schematic plan of an HMI reconfiguration progression from an initial square, to a square having convexly arcuate sides, to a square having concavely arcuate sides, and to a final square having alternating concavely and convexly arcuate sides, in accordance with a preferred embodiment of the invention.
Figure 4D:
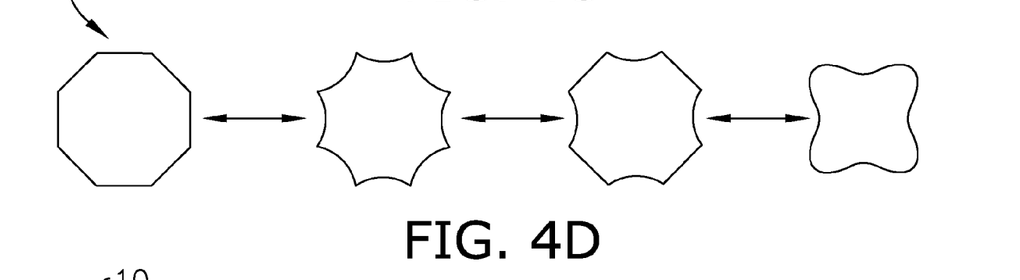
FIG. 4D is a plan view of an HMI reconfiguration progression from an initial octagon, to an octagon having concavely arcuate sides, to an octagon having alternating straight and concavely arcuate sides, and to a final octagon having alternating concavely and convexly arcuate sides, in accordance with another preferred embodiment of the invention.
Figure 5:
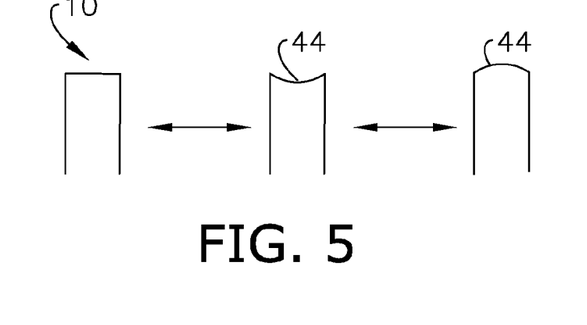
FIG. 5 is a schematic elevation of an HMI reconfiguration progression from an initial rectangle, to a rectangle having a concavely arcuate top surface, and to a rectangle having a convexly arcuate top surface, in accordance with another preferred embodiment of the invention.

FIGS. 4-5 present series progressions in which an active material interface 10 is caused to achieve a plurality of reversible shapes over time, such as, for example, where multi-segment SMP based interface is activated to achieve a first transition temperature and furthermore, to achieve a second transition temperature, as previously described. In FIG. 4A, the interface 10 initially presents a circular lateral cross-section, is caused to reversibly achieve an ellipsoidal cross-section when the element 22 is activated or deactivated; and then caused to achieve an ellipsoidal shape having concavely arcuate sides (or a "peanut" shape) when further activated. In lieu of series transformation, it is appreciated that each illustrated progression may reflect parallel transformation (as shown in hidden-line type in FIG. 4A), for example, wherein a plurality of separately activated elements 22 are provided and configured to result in a different modified shape (e.g., orientation, etc.) when differing sets of elements 22 are activated. That is to say, the multiple shapes shown in FIGS. 4A through 5 present exemplary shapes into which the starting geometry shown at the left of the figures could be deformed. It is appreciated that multiple discrete smart material actuator elements 22 connected to the HMI interface 10 that would allow achievement of the different shapes shown; they could be selected in an arbitrary order and not necessarily in the order shown. The number and orientation of the actuators 22 would dictate how many of the different shapes would be achievable.

In FIG. 4B, a reconfiguration progression is shown, wherein the interface 10 presents an initial circular lateral cross-section, is caused to achieve a circular wave form cross-section having six undulations, and then further caused to achieve, a final circular wave form having four undulations. FIG. 4C is a plan view of another progression, wherein the interface 10 transforms from an initial square, to a square having convexly arcuate sides, to a square having concavely arcuate sides, and finally to a square lateral cross-section having alternating concavely and convexly arcuate sides. FIG. 4D shows yet another progression, wherein the interface transforms from an initial octagon, to an octagon having concavely arcuate sides, to an octagon having alternating straight and concavely arcuate sides, and to a final octagon lateral cross-section having alternating concavely and convexly arcuate sides, as a result of progressive activation of element 22. In addition to these shapes, it is appreciated that modification may simply result in an enlarged or reduced scaling of the original geometric shape (FIGS. 3A-C).

It is also appreciated that modification of the geometric shape may be caused along the longitudinal profile of the interface 10 (FIG. 5). For example, as previously mentioned, activation of element 22 may result in the shortening or lengthening of the original (or first) height of the interface 10, so as to achieve a second height substantially (e.g., at least 10%, more preferably 25%, and most preferably 50%) different from the first height. As shown in FIG. 5, the interface 10 may be configured to reversibly transform from an initial rectangular elevation, to a rectangle having a concavely arcuate top surface/side 44, and/or to a rectangle having a convexly arcuate top surface/side 44.

Figure 6:
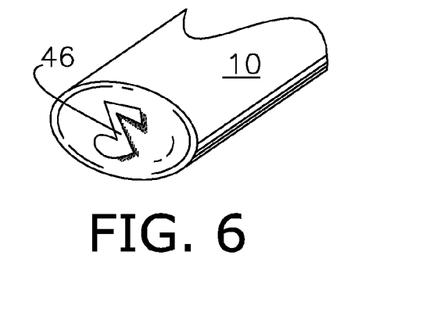
FIG. 6 is a perspective view of the distal tip of an HMI comprising active material and presenting a raised icon when the material is activated, in accordance with yet another preferred embodiment of the invention.

Finally, in yet another embodiment, the interface 10 is configured such that a raised indicia, visible feature, trademark, or icon 46 is caused to be formed thereupon (e.g., reversibly and/or slidably raised from a flush position with respect to the interface 10. In FIG. 6, for example, a musical note 46 is produced upon a volume control knob 10, when the element 22, located at or near the surface, is activated.

Figures 7A, 7B, 8A, 8B:
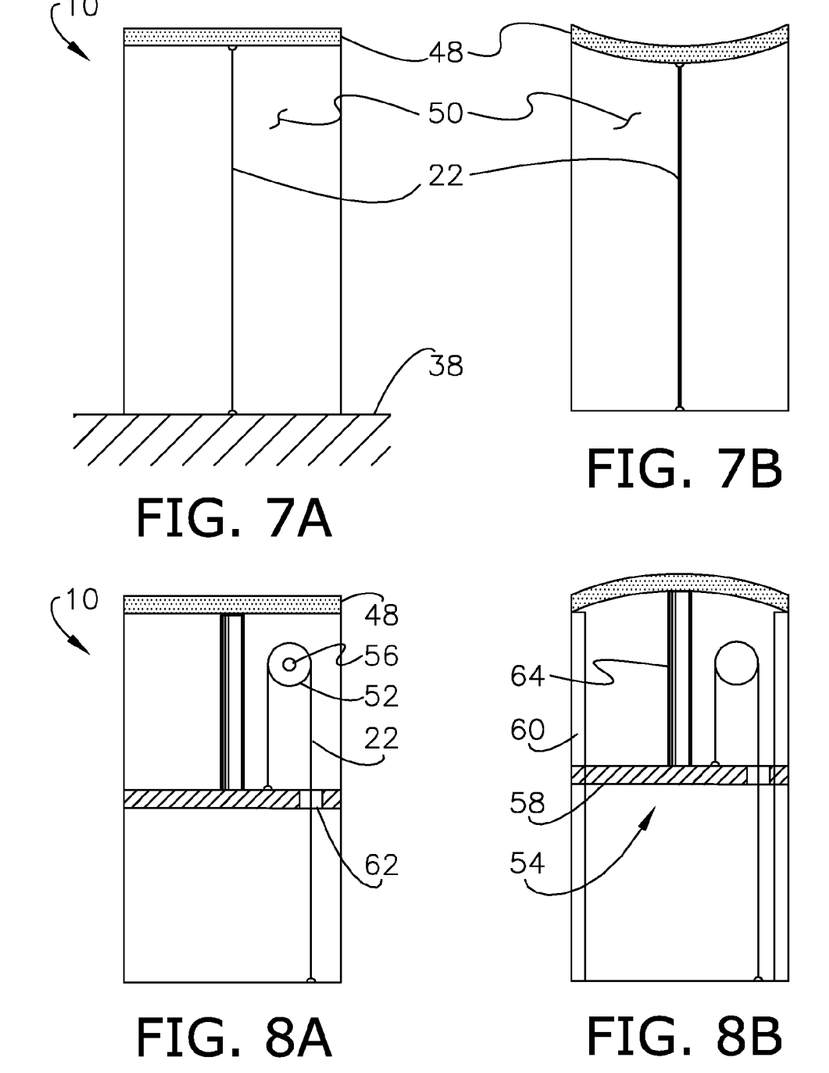
FIG. 7A is an elevational view of the inner-workings of an HMI including a flexible top layer, defining an interior space, and including a shape memory wire functionally disposed therein, in accordance with a preferred embodiment of the invention.
FIG. 7B is an elevation view of the HMI shown in FIG. 7A, wherein the wire actuator has been activated so as to cause a concavely arcuate profile in the layer.
FIG. 8A is an elevational view of the inner-workings of an HMI including a flexible top layer, defining an interior space, and including a shape memory wire, pulley and plunger functionally disposed therein, in accordance with a preferred embodiment of the invention.
FIG. 8B is an elevation view of the HMI shown in FIG. 8A, wherein the wire actuator has been activated so as to cause a convexly arcuate profile in the layer.

Exemplary inner-workings of the interface 10 are shown in FIGS. 7A-8B. More particularly, FIGS. 7A-B depict an interface 10 including a (top or distal) layer of flexible material 48, defining an interior space 50, and having a shape memory wire actuator 22 formed, for example, of SMA material in the deactivated martensite phase, functioning and at least partially reposed within the space 50. The wire 22 is attached to the interior surface of the layer 48 at its center, and to a fixed structure 38 at the opposite end. In this configuration, when the wire element 22 is activated and caused to contract, it exerts a pulling force against the layer 48 causing it to bend and form a concavely arcuate profile. When deactivated, the wire 22 returns to its softer martensite phase, where it is caused to stretch back to the original or normal length by the modulus of elasticity in the layer 48. It is appreciated that the biasing force exerted by the layer 48, when the wire 22 is in the activated austenite phase, accelerates transition to the martensite phase, which increases response time.

Figure 8C:
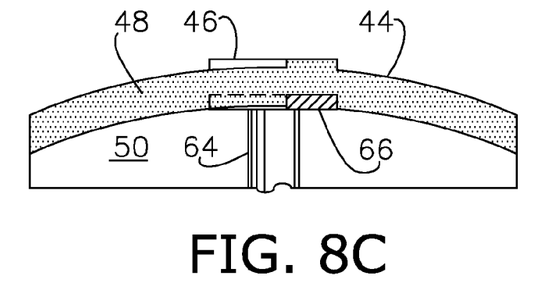
FIG. 8C is an enlarged view of the HMI shown in FIG. 8A-B, wherein the wire actuator has been activated and the plunger includes an engaging section operable to form a raised icon or indicia in the layer, in accordance with a preferred embodiment of the invention.

In FIGS. 8A-C, a pulley 52 and plunger 54 are further disposed within the space 50. The pulley 52 is attached to the interior wall of the interface 10 at a location at or near the layer 48, via an axle rod 56. The plunger 52 includes a base 58 that co-laterally extends to match the cross-sectional shape of the space 50. The base 58 and space 50 are cooperatively configured such that the plunger 54 linearly translates therein. More preferably, to prevent rotational displacement, the interface 10 further defines at least one, and more preferably a plurality of ribs 60 along the interior surface of the wall and the base 58 defines at least one and more preferably a plurality of notches (not shown) within which the ribs 60 slide during translation. The wire 22 passes through an orifice 62 defined by the base 58 and is entrained by the pulley 52 as it is doubled over back towards the base 58. As such, in this configuration, the wire 22 is lengthened, resulting in greater activation displacement and force. The plunger 54 further defines an elongated member 64 that orthogonally extends from the base 58 preferably at its center. The member 64 is caused to engage the layer 48 when the wire 22 is activated (FIG. 8B), and more preferably, further includes an engaging section 66 operable to form the raised indicia or icon 46 within the top surface 44 (FIG. 8C).

In operation, selective modification of the interface 10 can be effected by controller 26 communicatively coupled to the source 24, sensor(s) 28 and/or an input device for receiving user preferences. The controller 26 can be preprogrammed to have the source 24 deliver the activation signal using stand-alone algorithms or those based on sensory input. For example, the controller 26 may be configured to present a timer, so that activation and modification of the interface 10 results for a predetermined period (e.g., 10 seconds).

Sensor input is based upon a related or triggering condition. For example, air pressure can be monitored with a sensor to indicate when a window is opened during vehicle movement, when an air bag is actuated, or upon door closing, or the like. When such conditions are determined, likely-used interfaces 10, such as door locks, power window switches, etc. may be modified so as to facilitate selection and manipulation. The geometric shape of door locks and handles may also be modified, when the ignition of the vehicle 20 is toggled between ON/OFF, or the gear shift is positioned in and out of park. Other sensor inputs such as thermometer measurements indicating an interior cabin temperature exceeding a pre-set temperature threshold, and the like can be employed; here, where an exceedance of temperature is determined, tactile HVAC interface(s) 10 may be modified to facilitate selection and manipulation. Finally, in addition to or lieu of sensory input, it is appreciated that modification may preferably be triggered by receiving data from a telematic, short range, V2V, or cellular communication system (not shown) communicatively coupled to the controller.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A tactile human-machine interface adapted for facilitating selection and manipulation by a user and for modifying a system, said interface comprising:
   a reconfigurable body presenting a first geometric shape, orientation, position or characteristic, communicatively coupled to the system, and operable to modify at least one condition of the system when manually manipulated; and
   at least one active material element drivenly coupled to the body, and operable to undergo a reversible change in fundamental property when exposed to or occluded from an activation signal, wherein the change causes the body to achieve a second geometric shape, orientation, position or characteristic,
   wherein the element is selected from the group consisting essentially of shape memory alloys, shape memory polymers, paraffin wax, and magnetorheological elastomers.

2. The interface as claimed in claim 1, wherein a first cross-sectional geometric shape is presented, and a second cross-sectional geometric shape is manually caused, so as to be customizable, by the user.

3. The interface as claimed in claim 1, wherein the body is selected from the group consisting essentially of knobs, pushbuttons, dials, switches, sliders, balls, and rockers.

4. The interface as claimed in claim 1, wherein the body and element are integrally formed.

5. The interface as claimed in claim 1, wherein the body defines an exterior surface, an interior space, and an insulative outer layer, and the element is reposed within the space.

6. The interface as claimed in claim 1, wherein the body is externally engaged by the element.

7. The interface as claimed in claim 1, wherein a first permanent geometric shape is presented, and a second permanent geometric shape is achieved and one of a plurality of achievable permanent shapes by the body.

8. The interface as claimed in claim 1, wherein at least a portion of the body in the first shape presents a circular lateral cross-section having a first diameter, and in the second shape presents a lateral cross-section selected from the group consisting essentially of an ellipsoid, a peanut shape, a circular wave-form, a circle having a diameter greater than the first, and a circle having a diameter less than the first.

9. The interface as claimed in claim 1, wherein the body presents a polygonal lateral cross-section having straight sides in the first shape, and convexly or concavely arcuate sides in the second shape.

10. A tactile human-machine interface adapted for facilitating selection and manipulation by a user and for modifying a system, said interface comprising:
    a reconfigurable body presenting a first geometric shape, orientation, position or characteristic, and communicatively coupled to and operable to modify at least one condition of the system when manually manipulated;
    at least one active material element drivenly coupled to the body, and operable to undergo a reversible change in fundamental property when exposed to or occluded from an activation signal, wherein the change causes the body to achieve a second geometric shape, orientation, position or characteristic, and the element is selected from the group consisting essentially of shape memory alloys, shape memory polymers, paraffin wax, and magnetorheological elastomers;
    a source operable to generate the signal, and communicatively coupled, so as to cause the element to be exposed to the signal;
    a controller intermediately coupled to the source and element, and operable to selectively cause the element to be exposed to the signal; and
    at least one sensor operable to detect a condition and generate a data signal based thereupon, and communicatively coupled, so as to send the data signal to the controller,
    said controller being further configured to cause the change, only when the data signal is received.

11. A method of facilitating selection of a tactile human-machine interface by a user, wherein the interface presents a first geometric shape, orientation, position or characteristic, said method comprising the steps of:
- a. securing the interface relative to a source operable to expose the interface to an activation signal;
- b. selectively causing the interface to be exposed to the signal;
- c. modifying the geometric shape, orientation, position or characteristic of the interface as a result of being exposed to the signal, prior to selection; and
- d. discontinuing the signal after selection, and reversibly modifying the shape back to the first as a result of discontinuing the signal.

12. The method as claimed in claim 11, wherein step b) further includes the steps of receiving a voice command from the user, and causing the interface to be exposed to the signal only when the command is received.

\* \* \* \* \*